US012625055B2

(12) United States Patent
Degeal et al.

(10) Patent No.: US 12,625,055 B2
(45) Date of Patent: May 12, 2026

(54) SYSTEM AND METHOD FOR CALCULATING A DROPLET DELAY TIME, AND SORTING DEVICE

(71) Applicants: BECKMAN COULTER BIOTECHNOLOGY (SUZHOU) CO., LTD., Suzhou (CN); BECKMAN COULTER, INC., Brea, CA (US)

(72) Inventors: Jeff Degeal, Brea, CA (US); Robert Burr, Brea, CA (US); John Tyksinski, Brea, CA (US); Jingzhe Zhao, Suzhou (CN); Sheng Yu, Suzhou (CN); Xuewen Qiao, Suzhou (CN)

(73) Assignees: Beckman Coulter Biotechnology (Suzhou) Co., Ltd., California (CA); Beckman Coulter, Inc., Brea, CA (US)

( * ) Notice: Subject to any disclaimer, the term of this patent is extended or adjusted under 35 U.S.C. 154(b) by 83 days.

(21) Appl. No.: 18/262,359

(22) PCT Filed: Dec. 28, 2021

(86) PCT No.: PCT/CN2021/141828
§ 371 (c)(1),
(2) Date: Jul. 20, 2023

(87) PCT Pub. No.: WO2022/156494
PCT Pub. Date: Jul. 28, 2022

(65) Prior Publication Data
US 2024/0085305 A1     Mar. 14, 2024

(30) Foreign Application Priority Data
Jan. 20, 2021     (CN) .......................... 202110076453.2

(51) Int. Cl.
G01N 15/14          (2024.01)
G01N 15/149         (2024.01)

(52) U.S. Cl.
CPC ..... G01N 15/1427 (2013.01); G01N 15/1425 (2013.01); G01N 15/147 (2013.01); *G01N 15/149* (2024.01); *G01N 2015/1493* (2013.01)

(58) Field of Classification Search
CPC ............ G01N 15/1427; G01N 15/147; G01N 15/149; G01N 15/1425; G01N 2015/1493
See application file for complete search history.

(56) References Cited

U.S. PATENT DOCUMENTS

| | | | |
|---|---|---|---|
| 4,318,481 A | 3/1982 | Lombardo et al. | |
| 4,538,733 A | 9/1985 | Hoffman | |

(Continued)

FOREIGN PATENT DOCUMENTS

| | | |
|---|---|---|
| CN | 1950690 A | 4/2007 |
| CN | 102792145 A | 11/2012 |

(Continued)

OTHER PUBLICATIONS

English translation of CN111948118A. Obtained from Espacenet on Apr. 15, 2025. (Year: 2025).*

(Continued)

*Primary Examiner* — Michael A Lyons
(74) *Attorney, Agent, or Firm* — Merchant & Gould P.C.

(57) ABSTRACT

The present application discloses a system and a method for calculating a droplet delay time in a liquid flow of a sorting device. The system includes: a first laser source configured to emit a first laser beam to a liquid flow of a sorting device, the first laser beam and the liquid flow intersecting at a first laser interrogation point; a second laser source configured to emit a second laser beam to the liquid flow, the second laser beam and the liquid flow intersecting at a second laser interrogation point; and a droplet delay time calculation unit configured to calculate, based on of the time when the particle in the liquid flow passes through the first and second (Continued)

laser interrogation point and the time when the particle passes through the second laser interrogation point, a first delay time, and calculate, a droplet delay time.

17 Claims, 5 Drawing Sheets

(56) References Cited

U.S. PATENT DOCUMENTS

| | | | |
|---|---|---|---|
| 5,985,216 A | 11/1999 | Rens et al. | |
| 6,079,836 A | 6/2000 | Burr et al. | |
| 6,767,188 B2 | 7/2004 | Vrane et al. | |
| 6,880,414 B2 | 4/2005 | Norton | |
| 7,201,875 B2 | 4/2007 | Norton et al. | |
| 7,417,734 B2 | 8/2008 | Kanda | |
| 7,443,491 B2 | 10/2008 | Kanda | |
| 7,544,326 B2 | 6/2009 | Norton et al. | |
| 7,639,358 B2 | 12/2009 | Kanda | |
| 7,776,268 B2 | 8/2010 | Rich | |
| 7,799,575 B2 | 9/2010 | Jiang | |
| 7,821,631 B1 | 10/2010 | Javadi | |
| 7,990,525 B2 * | 8/2011 | Kanda | G01N 15/1429 |
| | | | 356/73 |
| 8,140,300 B2 | 3/2012 | Dunne et al. | |
| 8,187,888 B2 | 5/2012 | Rich | |
| 8,233,146 B2 | 7/2012 | Chen | |
| 8,303,894 B2 | 11/2012 | Rich | |
| 8,358,412 B2 | 1/2013 | Kanda | |
| 8,528,427 B2 | 9/2013 | Vrane et al. | |
| 8,564,776 B2 | 10/2013 | Graves et al. | |
| 8,665,439 B2 | 3/2014 | Luscher | |
| 8,748,183 B2 | 6/2014 | Durack et al. | |
| 8,767,212 B2 | 7/2014 | Kanda et al. | |
| 9,034,259 B2 | 5/2015 | Kanda | |
| 9,092,034 B2 | 7/2015 | Vrane et al. | |
| 9,170,187 B2 | 10/2015 | Yan et al. | |
| 9,207,166 B2 | 12/2015 | Bardell et al. | |
| 9,429,276 B2 | 8/2016 | Katsumoto | |
| 9,523,677 B2 | 12/2016 | Ball et al. | |
| 9,562,860 B1 | 2/2017 | Pangarkar et al. | |
| 9,645,080 B2 | 5/2017 | Matula et al. | |
| 9,784,659 B2 | 10/2017 | Tanase et al. | |
| 9,897,530 B2 | 2/2018 | Durack et al. | |
| 10,031,061 B2 | 7/2018 | Rowlen et al. | |
| 10,036,697 B2 | 7/2018 | Fox et al. | |
| 10,451,534 B2 | 10/2019 | Otsuka et al. | |
| 10,557,786 B2 | 2/2020 | Gibbons et al. | |
| 10,627,331 B2 | 4/2020 | Chandler | |
| 2004/0086159 A1 * | 5/2004 | Lary | G01N 15/1425 |
| | | | 382/128 |
| 2008/0293146 A1 | 11/2008 | Frazier et al. | |
| 2011/0061471 A1 | 3/2011 | Rich et al. | |
| 2011/0259749 A1 | 10/2011 | Kanda | |
| 2012/0308436 A1 | 12/2012 | Kanda | |
| 2013/0007903 A1 | 1/2013 | Evans et al. | |
| 2014/0051064 A1 | 2/2014 | Van Den Engh | |

| | | | |
|---|---|---|---|
| 2014/0377771 A1 | 12/2014 | Bibette et al. | |
| 2017/0241889 A1 | 8/2017 | Otsuka et al. | |
| 2017/0248515 A1 | 8/2017 | Duckett, Jr. et al. | |
| 2017/0307502 A1 | 10/2017 | Mason et al. | |
| 2017/0350878 A1 | 12/2017 | Holmes et al. | |
| 2018/0095024 A1 | 4/2018 | Norton | |
| 2018/0284009 A1 * | 10/2018 | Kaduchak | G01N 15/1436 |
| 2018/0313740 A1 * | 11/2018 | Otsuka | G01N 15/1404 |
| 2020/0103406 A1 | 4/2020 | Holmes et al. | |
| 2020/0158545 A1 | 5/2020 | Norton et al. | |

FOREIGN PATENT DOCUMENTS

| | | |
|---|---|---|
| CN | 102782145 B | 2/2015 |
| CN | 104487820 A | 4/2015 |
| CN | 104862273 A | 8/2015 |
| CN | 105143851 A | 12/2015 |
| CN | 103517980 B | 9/2016 |
| CN | 104755906 B | 8/2017 |
| CN | 206818580 U | 12/2017 |
| CN | 107782657 A | 3/2018 |
| CN | 108169104 A | 6/2018 |
| CN | 207649728 U | 7/2018 |
| CN | 109070083 A | 12/2018 |
| CN | 208537364 U | 2/2019 |
| CN | 105980059 B | 8/2019 |
| CN | 110234442 A | 9/2019 |
| CN | 111122422 A | 5/2020 |
| CN | 111879685 A | 11/2020 |
| CN | 111948118 A | 11/2020 |
| EP | 998672 A2 | 5/2000 |
| EP | 1574838 A1 | 9/2005 |
| EP | 1099105 B1 | 2/2006 |
| EP | 1757922 A1 | 2/2007 |
| EP | 1391717 B1 | 5/2008 |
| EP | 2702133 A1 | 3/2014 |
| EP | 2917718 A1 | 9/2015 |
| EP | 2984468 A1 | 2/2016 |
| EP | 2357464 B1 | 3/2016 |
| EP | 3189322 A1 | 7/2017 |
| EP | 3445490 A1 | 2/2019 |
| EP | 3090248 B1 | 6/2020 |
| WO | 1999005504 A2 | 2/1999 |
| WO | 2004051238 A1 | 6/2004 |
| WO | 2005106427 A1 | 11/2005 |
| WO | 2007018087 A1 | 2/2007 |
| WO | 2009078307 A1 | 6/2009 |
| WO | 2011144208 A2 | 11/2011 |
| WO | 2014127379 A1 | 8/2014 |
| WO | 2016035284 A1 | 3/2016 |
| WO | 2017072360 A1 | 5/2017 |
| WO | 2018065349 A1 | 4/2018 |
| WO | 2019127563 A1 | 7/2019 |

OTHER PUBLICATIONS

International Search Report and Written Opinion for PCT/CN2021/141828 (Mar. 23, 2022).

* cited by examiner

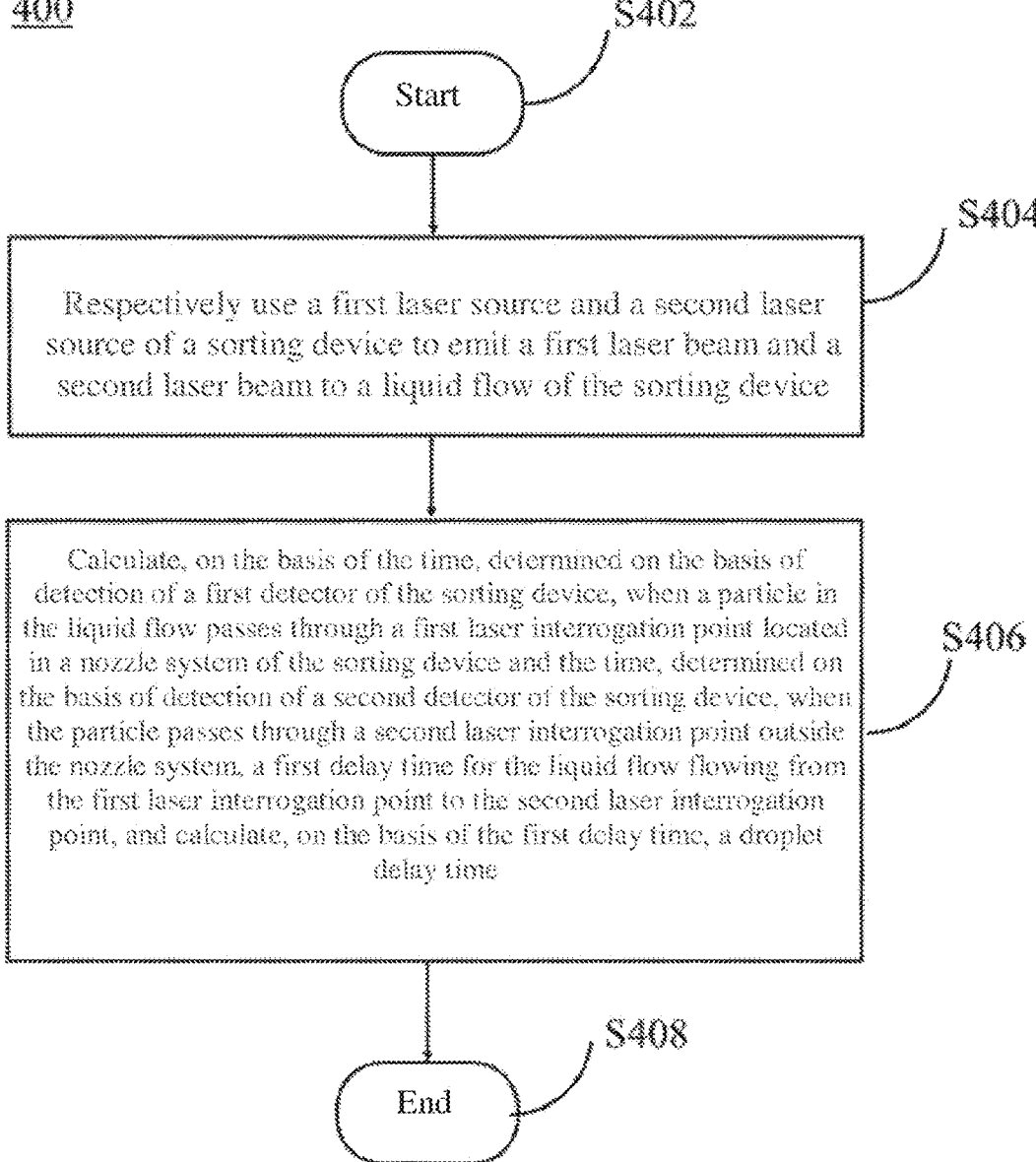

400

S402

Start

S404

Respectively use a first laser source and a second laser source of a sorting device to emit a first laser beam and a second laser beam to a liquid flow of the sorting device Calculate, on the basis of the time, determined on the basis of detection of a first detector of the sorting device, when a particle in the liquid flow passes through a first laser interrogation point located in a nozzle system of the sorting device and the time, determined on the basis of detection of a second detector of the sorting device, when the particle passes through a second laser interrogation point outside the nozzle system, a first delay time for the liquid flow flowing from the first laser interrogation point to the second laser interrogation point, and calculate, on the basis of the first delay time, a droplet delay time

S406

S408

End

FIG. 4

SYSTEM AND METHOD FOR CALCULATING A DROPLET DELAY TIME, AND SORTING DEVICE

This application is a U.S. National Stage Application of PCT/CN2021/141828 filed Dec. 28, 2021, which claims benefit of priority to Chinese Patent Application No. 202110076453.2, filed Jan. 20, 2021, and which applications are incorporated herein by reference in their entireties. To the extent appropriate, a claim of priority is made to each of the above-disclosed applications.

TECHNICAL FIELD

The present disclosure relates to the field of sorting, and specifically to a system and a method for calculating a droplet delay time, and a sorting device.

BACKGROUND

Sorting devices such as flow cytometers classify particles by electrostatically deflecting droplets containing the particles. For a sorting device, in order to appropriately deflect a droplet containing a particle of interest by an electrostatic field, it is necessary to determine the time for charging a liquid flow. For example, a droplet delay time, that is, the time from a laser interrogation point of the particle of interest to a separation point of the droplet containing the particle of interest, can be used to determine the time for charging the liquid flow. Therefore, it is desirable to provide a technology that can calculate the droplet delay time.

SUMMARY

A brief summary of the present disclosure is given below in order to provide a basic understanding of certain aspects of the present disclosure. However, it should be understood that this summary is not an exhaustive summary of the present disclosure. It is not intended to be used to determine the key or important part of the present disclosure, nor is it intended to be used to limit the scope of the present disclosure. Its purpose is merely to present some concepts about the present disclosure in a simplified form as a prelude to the more detailed description given later.

In view of the above problems, the present disclosure aims to provide an improved system and a method for calculating a droplet delay time, and a sorting device, so as to calculate the droplet delay time.

According to an aspect of the present disclosure, a system for calculating a droplet delay time in a liquid flow of a sorting device is provided, including: a first laser source configured to emit a first laser beam to a liquid flow of the sorting device, the first laser beam and the liquid flow intersecting at a first laser interrogation point located in a nozzle system of the sorting device; a second laser source configured to emit a second laser beam to the liquid flow, the second laser beam and the liquid flow intersecting at a second laser interrogation point located outside the nozzle system, wherein the second laser interrogation point is before a droplet separation point; a first detector corresponding to the first laser source and configured to detect emission, in response to the first laser beam, of a particle in the liquid flow to determine the time when the particle passes through the first laser interrogation point; a second detector corresponding to the second laser source and configured to detect emission, in response to the second laser beam, of the particle in the liquid flow to determine the time when the particle passes through the second laser interrogation point; and a droplet delay time calculation unit configured to calculate, on the basis of the time when the particle in the liquid flow passes through the first laser interrogation point and the time when the particle passes through the second laser interrogation point, a first delay time for the liquid flow flowing from the first laser interrogation point to the second laser interrogation point, and calculate, on the basis of the first delay time, a droplet delay time.

According to another aspect of the present disclosure, a sorting device including the above-mentioned system is provided.

According to yet another aspect of the present disclosure, a method for calculating a droplet delay time in a liquid flow of a sorting device is provided, including: respectively using a first laser source and a second laser source of the sorting device to emit a first laser beam and a second laser beam to a liquid flow of the sorting device; calculating, on the basis of the time, determined on the basis of detection of a first detector of the sorting device, when a particle in the liquid flow passes through a first laser interrogation point located in a nozzle system of the sorting device and the time, determined on the basis of detection of a second detector of the sorting device, when the particle passes through a second laser interrogation point outside the nozzle system, a first delay time for the liquid flow flowing from the first laser interrogation point to the second laser interrogation point; and calculating a droplet delay time on the basis of the first delay time. The first laser beam and the liquid flow intersect at the first laser interrogation point. The second laser beam and the liquid flow intersect at the second laser interrogation point. The second laser interrogation point is before a droplet separation point. The first detector is configured to detect emission, in response to the first laser beam, of the particle in the liquid flow to determine the time when the particle passes through the first laser interrogation point. The second detector is configured to detect emission, in response to the second laser beam, of the particle in the liquid flow to determine the time when the particle pass through the second laser interrogation point.

According to other aspects of the present disclosure, computer program code and a computer program product for implementing the above-mentioned method according to the present disclosure, as well as a computer-readable storage medium on which the computer program code for implementing the above-mentioned method according to the present disclosure are further provided.

Other aspects of embodiments of the present disclosure are given in the following description section. The detailed description is used to fully disclose preferred embodiments of the embodiments of the present disclosure without imposing limitations on them.

DESCRIPTION OF THE DRAWINGS

The present disclosure can be better understood by referring to the detailed description given below in conjunction with the accompanying drawings, in which the same or similar reference numerals are used in all the drawings to denote the same or similar components. The drawings together with the following detailed description are included in the specification and form a part of the specification, and are used to further illustrate the preferred embodiments of the present disclosure and explain the principles and advantages of the present disclosure. In the drawings:

FIG. 4 is a flow chart showing a flow example for calculating a droplet delay time according to an embodiment of the present disclosure.

DETAILED DESCRIPTION

Figure 1:
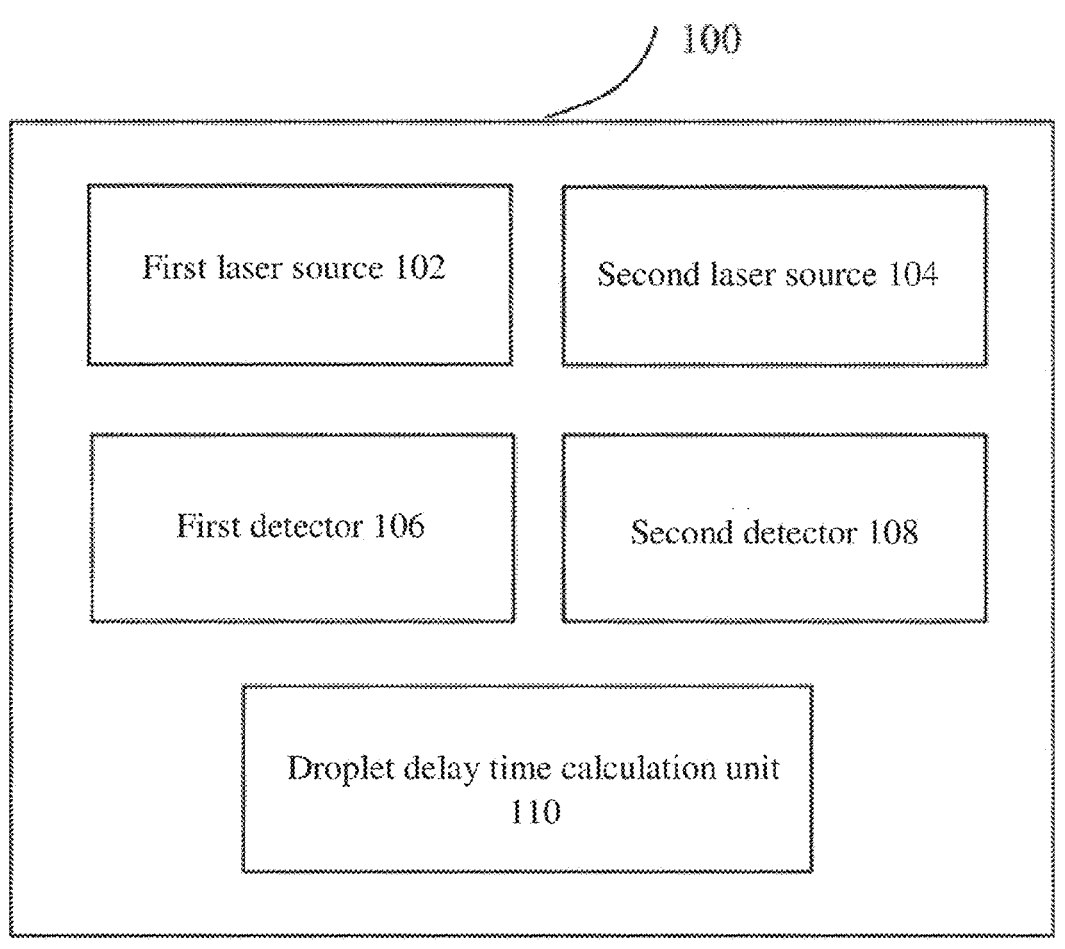
FIG. 1 is a block diagram showing a configuration example of a system for calculating a droplet delay time according to an embodiment of the present disclosure.

Exemplary embodiments of the present disclosure will be described below with reference to the accompanying drawings. For the sake of clarity and conciseness, not all features of actual implementation modes are described in the specification. However, it should be understood that many implementation mode-specific decisions must be made during the development of any such actual embodiment in order to achieve the developer's specific purchases, for example, in compliance with those restrictions related to the system and business, and these restrictions may vary with different implementation modes. In addition, it should also be understood that although the development work may be very complicated and time-consuming, for those skilled in the art who benefit from the present disclosure, such development work is only a routine task.

It should be understood that although the terms "first," "second," etc. may be used herein to describe various elements, these elements should not be limited by these terms. These terms are only used to distinguish one element from another element. For example, the first element may be referred to as the second element without departing from the scope of the present disclosure, and similarly, the second element may be referred to as the first element.

In addition, in this specification and the drawings, there is also a case where a plurality of components having substantially the same functional configurations are distinguished by appending different letters after the same reference signs. For example, a third laser source is divided into third laser source 112a and third laser source 112b as needed. However, only the same reference signs are added if it is not necessary to distinguish each of a plurality of components having basically the same function configurations. For example, when there is no need to distinguish third laser source 112a and third laser source 112b, third laser source 112a and third laser source 112b are simply referred to as third laser source 112.

Here, it should further be noted that in order to avoid obscuring the present disclosure due to unnecessary details, only device structures and/or processing steps closely related to the solutions according to the present disclosure are shown in the drawings, ad other details that have little to do with the present disclosure are omitted.

The embodiments according to the present disclosure will be described in detail below with reference to the accompanying drawings.

Figure 2:
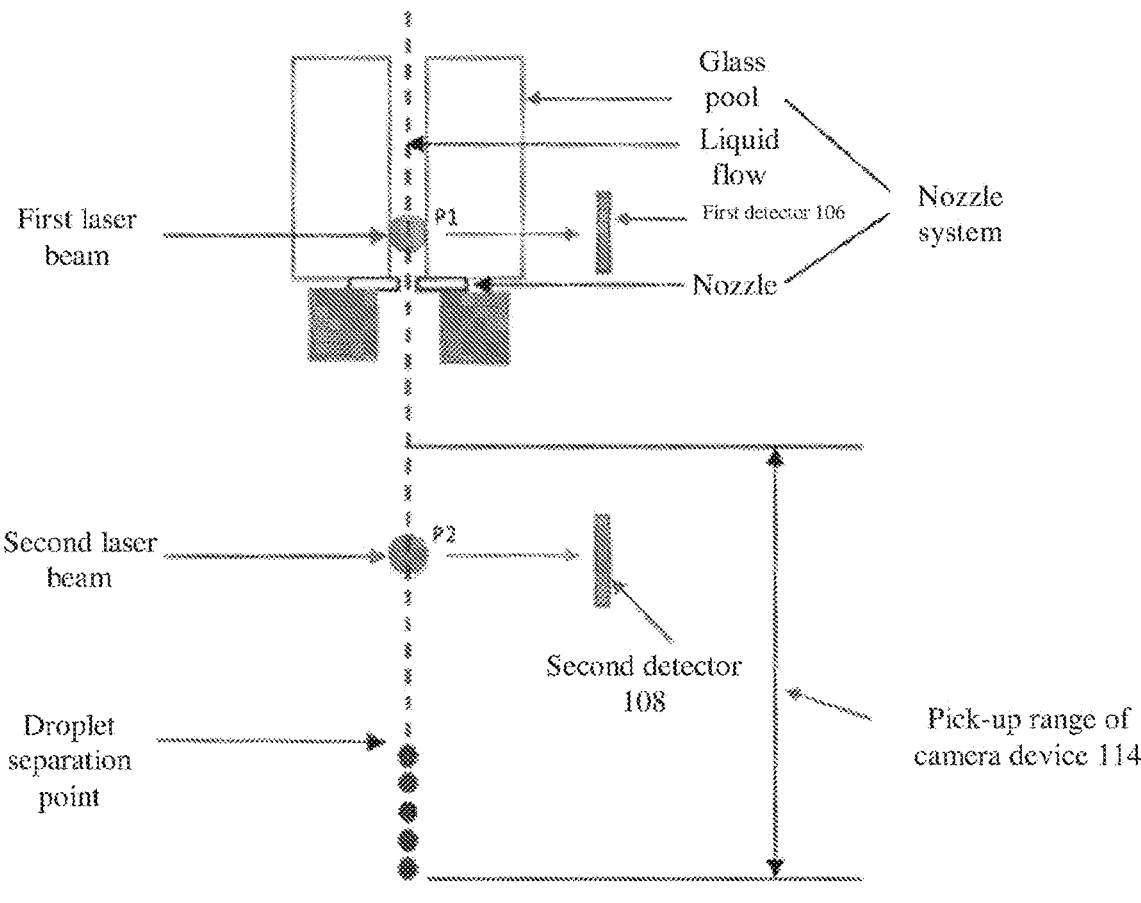
FIG. 2 is a schematic diagram showing an architecture example of a specific implementation mode of a system for calculating a droplet delay time according to an embodiment of the present disclosure.

First, an implementation example of a system for calculating a droplet delay time in a liquid flow of a sorting device according to an embodiment of the present disclosure will be described with reference to FIG. 1 and FIG. 2. FIG. 1 is a block diagram showing a configuration example of system 100 for calculating a droplet delay time according to an embodiment of the present disclosure. FIG. 2 is a schematic diagram showing an architecture example of a specific implementation mode of system 100 for calculating a droplet delay time according to an embodiment of the present disclosure.

As shown in FIGS. 1 and 2, system 100 for calculating a droplet delay time according to an embodiment of the present disclosure may include first laser source 102 (not shown in FIG. 2), second laser source 104 (not shown in FIG. 2), first detector 106 corresponding to first laser source 102, second detector 108 corresponding to second laser source 104, and droplet delay time calculation unit 110 (not shown in FIG. 2).

First laser source 102 may be configured to emit a first laser beam to a liquid flow of the sorting device. As shown in FIG. 2, the first laser beam may intersect the liquid flow at first laser interrogation point P1 located in a nozzle system of the sorting device.

Second laser source 104 may be configured to emit a second laser beam to the liquid flow. As shown in FIG. 2, the second laser beam may intersect the liquid flow at second laser interrogation point P2 located outside the nozzle system, and second laser interrogation point P2 is before a droplet separation point.

First detector 106 may be configured to detect emission, in response to the first laser beam, of a particle in the liquid flow to determine the time when the particle passes through first laser interrogation point P1. Second detector 108 is configured to detect emission, in response to the second laser beam, of the particle in the liquid flow to determine the time when the particle passes through second laser interrogation point P2. For example, first detector 106 and second detector 108 may be photodetectors respectively configured to detect scattered light signals generated, in response to the first laser beam and the second laser beam, by the particle in the liquid flow.

Droplet delay time calculation unit 110 may be configured to calculate, on the basis of the time when the particle in the liquid flow passes through first laser interrogation point P1 and the time when the particle passes through second laser interrogation point P2, a first delay time for the liquid flow flowing from first laser interrogation point P1 to second laser interrogation point P2, and calculate, on the basis of the first delay time, a droplet delay time.

Sorting devices such as flow cytometers classify particles by electrostatically deflecting droplets containing the particles. In order to appropriately deflect a droplet containing a particle of interest by an electrostatic field, it is necessary to charge the liquid flow for a proper time. Accurate droplet delay time is important to determine the proper charging time. In order to determine the droplet delay time, Patent Document 1 (CN102782145B) proposes a technique that uses image processing to calculate the droplet delay time. However, since the calculation of the droplet delay time on the basis of this technology requires counting the fluctuations of the liquid flow, and the fluctuations of the liquid flow do not occur until the liquid flow flows out from the nozzle system of the sorting device, for a glass-pool-based flow cytometer or a sorting device with a laser interrogation point within the nozzle system, this technique cannot calculate the delay time from the laser interrogation point to the nozzle, and thus is not applicable.

As described above, system 100 for calculating a droplet delay time according to an embodiment of the present disclosure may calculate, on the basis of the time, determined on the basis of the detection of first detector 106, when a particle in the liquid flow passes through first laser interrogation point P1 and the time, determined on the basis of the detection of second detector 108, when the particle in the liquid flow passes through second laser interrogation point P2, a first delay time for the liquid flow flowing from first laser interrogation point P1 to second laser interrogation point P2, and calculate the droplet delay time on the basis of the first delay time, so that the droplet delay time of the sorting device with the first laser interrogation point within the nozzle system can be calculated.

It is noted that although specific positions of first laser interrogation point P1 and second laser interrogation point P2 are shown in FIG. 2, the specific positions shown are merely examples, and the specific positions of first laser interrogation point P1 and second laser interrogation point P2 are not limited by the drawings.

As an example, droplet delay time calculation unit 110 may also calculate a second delay time for the liquid flow flowing from second laser interrogation point P2 to the droplet separation point, and calculate the sum of the first delay time and the second delay time as the droplet delay time.

For example, according to an embodiment of the present disclosure, the sorting device may be a flow cytometer. For example, as shown in FIG. 2, the sorting device may be a glass-pool-based flow cytometer. In particular, the nozzle system includes a glass pool and a nozzle. When the sorting device is a glass-pool-based flow cytometer, first laser interrogation point P1 may be located in the glass pool. However, the sorting device is not limited to the flow cytometer, and the sorting device may be any suitable sorting device.

For example, according to an embodiment of the present disclosure, system 100 for calculating the droplet delay time may further include camera device 114 adapted to obtain an image of the liquid flow. In particular, second laser interrogation point P2 and the droplet separation point are within a pick-up range of camera device 114, as shown in FIG. 2. In this case, droplet delay time calculation unit 110 may calculate the second delay time by using a plurality of images of the liquid flow obtained by camera device 114. For example, the second delay time may be calculated by the method described in Patent Document 1 above.

In addition, for example, the second delay time may be determined through an experimental and repeated trial and error scheme.

For example, according to an embodiment of the present disclosure, droplet delay time calculation unit 110 may calculate an average value of first measurement times of a plurality of particles as the first delay time. For each particle, the first measurement time refers to a difference between the time, determined on the basis of the detection of first detector 106, when the particle passes through first laser interrogation point P1 and the time, determined on the basis of the detection of second detector 108, when the particle passes through second laser interrogation point P2.

For example, an algorithm based on a sheath fluid pressure, a temperature, and a nozzle size may be created on the basis of the first measurement times of the plurality of particles and is used for calculating the first delay time. Therefore, for a sorting device with a specific nozzle and a glass pool, this algorithm may be used to calculate the first delay time without running the liquid flow again. Of course, those skilled in the art can understand that, for a sorting device with a specific nozzle and a glass pool, the liquid flow may be run to calibrate the first delay time obtained on the basis of the algorithm.

For example, according to an embodiment of the present disclosure, for each of multiple types of particle sizes, droplet delay time calculation unit 110 may calculate a first delay time for the particle size on the basis of first measurement times of a plurality of particles with the particle size, so that the first delay time is calculated to be different for different particle sizes. For example, droplet delay time calculation unit 110 may calculate, for each of the multiple types of particle sizes, an average value of first measurement times of a plurality of particles with the particle size as the first delay time for the particle size.

For example, in a glass-pool-based flow cytometer, the particle size has a great influence on the speed at which particles pass through the glass pool, so the transit times (i.e., the time for passing through the glass pool) of particles with different particle sizes are different. This difference in transit times causes a difference in the first delay times. As described above, according to an embodiment of the present disclosure, for each type of the multiple types of particle sizes, the first delay time for the particle size can be calculated on the basis of first measurement times of a plurality of particles with the particle size, so that the first delay time can be calculated in consideration of particle size, thereby improving the accuracy of the calculated first delay time and then improving the accuracy of the calculated droplet delay time.

For example, according to an embodiment of the present disclosure, system 100 for calculating a droplet delay time may further include a particle size calculation unit (not shown in the figure). Since the pulse width of a signal obtained by first detector 106 detecting the emission, in response to the first laser beam, of each particle is associated with the spot size of the first laser beam and the size of each particle, for example, the particle size calculation unit may be configured to calculate, for each particle, the size of the particle on the basis of a pulse width of a signal obtained by first detector 106 detecting the emission, in response to the first laser beam, of the particle and the spot size of the first laser beam.

For example, according to an embodiment of the present disclosure, droplet delay time calculation unit 110 may create, on the basis of the first delay times of the multiple types of particle sizes, a lookup table that characterizes a relationship between particle sizes and first delay times. In addition, for example, when the spot size of the first laser beam is fixed, the lookup table may be created on the basis of the pulse width of the signal obtained by first detector 106 detecting the emission, in response to the first laser beam, of the corresponding particle in the liquid flow and the first delay time, and in the subsequent usage process, the pre-created lookup table is searched directly on the basis of the pulse width of the signal obtained by detecting the emission, in response to the first laser beam, of the corresponding particle in the liquid flow, so as to obtain the first delay time.

For example, according to an embodiment of the present disclosure, an expression that characterizes the relationship between particle sizes and first delay times may be created on the basis of the first delay times of the multiple types of particle sizes. Considering the wide variety of particle sizes, if the first delay time is calculated for each type of particle size, much time and labor will be required. As described above, the expression that characterizes the relationship between particle sizes and first delay times is created on the basis of the first delay times of the multiple types of particle sizes, so that only the first delay times of partial particle sizes need to be calculated, and for other particle sizes, the created expression can be used to obtain the corresponding first delay times, which can reduce the workload of calculating the first delay time.

In addition, similar to the above situation of creating the lookup table, when the spot size of the first laser beam is fixed, the expression may be created on the basis of the pulse width of the signal obtained by first detector 106 detecting the emission, in response to the first laser beam, of the corresponding particle in the liquid flow and the first delay time, and in the subsequent usage process, the created expression can be used directly on the basis of the pulse width of the signal obtained by detecting the emission, in response to the first laser beam, of the corresponding particle in the liquid flow, so as to obtain the first delay time.

Figure 3:
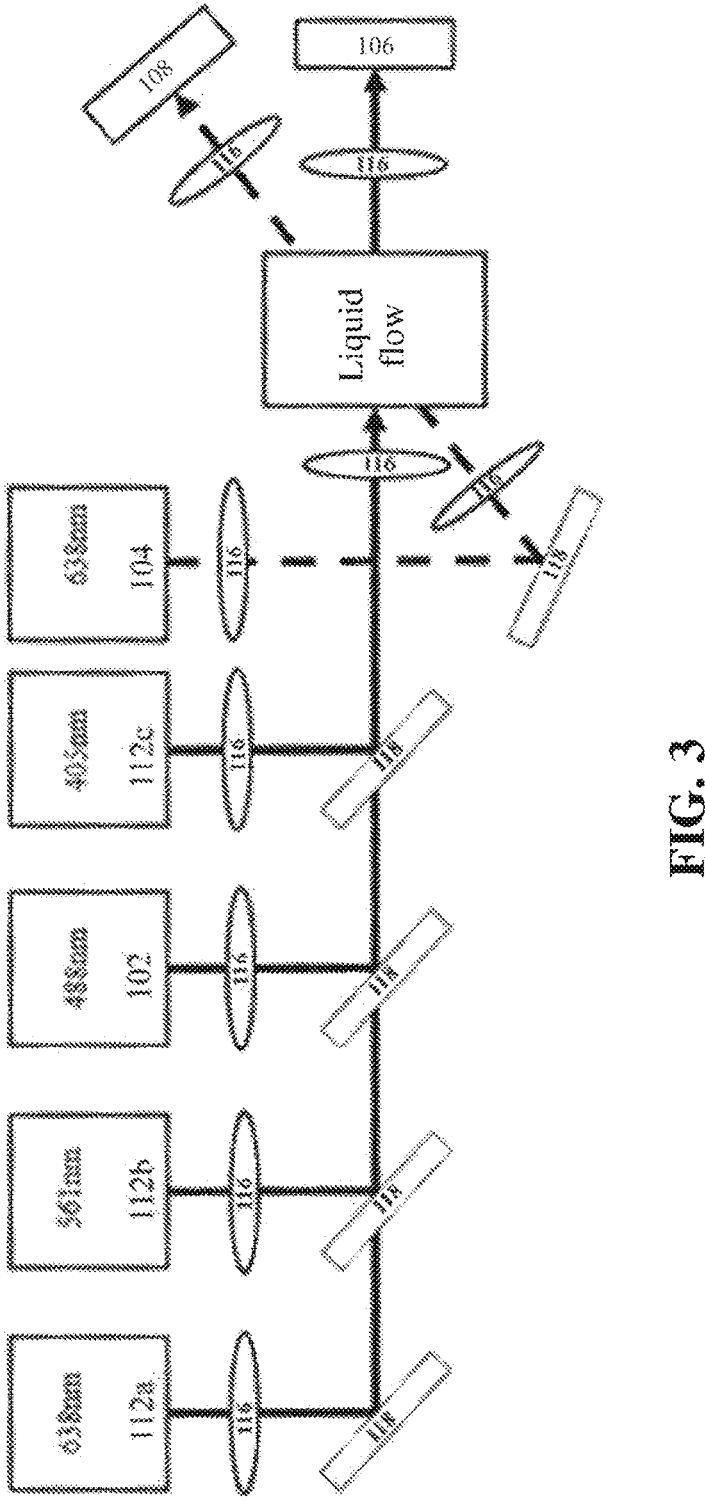
FIG. 3 is a schematic diagram showing an architecture example of a specific implementation mode of a system for calculating a droplet delay time according to another embodiment of the present disclosure.

For example, as shown in FIG. 3, according to an embodiment of the present disclosure, system 100 for calculating a droplet delay time may further include third laser source 112 and a light beam adjusting element such as collimating/focusing element 116 and reflecting mirror 118. Third laser source 112 may be configured to emit a third laser beam to the liquid flow for fluorescence excitation. The first laser beam emitted by first laser source 102 may also be used for fluorescence excitation. In this case, for example, the third laser beams emitted by third laser sources 112a, 112b, and 112c and the first laser beam emitted by first laser source 102 may be transmitted to the liquid flow along the same path through the light beam adjusting element such as collimating/focusing element 116 and reflecting mirror 118. That is, the third laser beams emitted by third laser sources 112a, 112b, and 112c and the first laser beam emitted by first laser source 102 may be combined into one light beam.

It is noted that the specific arrangement of various elements such as the light beam adjusting element and a fluorescence collecting element shown in FIG. 3 is only an example, and the arrangement of the various elements is not limited by the drawings. Those skilled in the art can arrange various elements according to actual needs. In addition, the numbers and emission wavelengths of first laser source 102, second laser source 104, and third laser sources 112a, 112b, and 112c shown in FIG. 3 are merely examples, and the number and emission wavelength of each laser source are not limited by the drawings. Those skilled in the art can set the number and emission wavelength of each laser source according to actual needs.

According to an embodiment of the present disclosure, a sorting device including above-mentioned system 100 for calculating a droplet delay time in a liquid flow is further provided.

System 100 for calculating a droplet delay time in a liquid flow of a sorting device according to the embodiment of the present disclosure has been described above. Corresponding to the embodiment of system 100 for calculating a droplet delay time in a liquid flow of a sorting device, the present disclosure further provides an embodiment of a method for calculating a droplet delay time in a liquid flow of a sorting device below. FIG. 4 is a flow chart showing a flow example of method 400 for calculating a droplet delay time according to an embodiment of the present disclosure.

As shown in FIG. 4, method 400 for calculating a droplet delay time according to the embodiment of the present disclosure may start at step S402 and end at step S408. Method 400 for calculating a droplet delay time according to the embodiment of the present disclosure may include laser beam emission step S404 and droplet delay time calculation step S406.

In laser beam emission step S404, a first laser source and a second laser source of a sorting device can be respectively used to emit a first laser beam and a second laser beam to a liquid flow of the sorting device. In particular, the first laser beam and the liquid flow intersect at a first laser interrogation point located in a nozzle system of the sorting device, and the second laser beam and the liquid flow intersect at a second laser interrogation point located outside the nozzle system; and the second laser interrogation point is before a droplet separation point.

In droplet delay time calculation step S406, a first delay time for the liquid flow flowing from the first laser interrogation point to the second laser interrogation point may be calculated according to the time, determined on the basis of detection of first detector 106 of the sorting device, when a particle in the liquid flow passes through the first laser interrogation point and the time, determined on the basis of detection of second detector 108 of the sorting device, when the particle in the liquid flow passes through the second laser interrogation point, and the droplet delay time is calculated on the basis of the first delay time. For example, droplet delay time calculation step S406 may be implemented by droplet delay time calculation unit 110 described in the above system embodiment, so specific details may refer to the description of droplet delay time calculation unit 110 above, which will not be repeated here.

In addition, the configuration of first detector 106 and second detector 108 may be similar to that of first detector 106 and second detector 108 in the above system embodiment, so the specific details may refer to the descriptions of first detector 106 and second detector 108 in the above system embodiment, which will not be repeated here.

For example, according to an embodiment of the present disclosure, in droplet delay time calculation step S406, a second delay time for the liquid flow flowing from the second laser interrogation point to the droplet separation point may also be calculated, and the sum of the first delay time and the second delay time may be calculated as the droplet delay time.

For example, according to an embodiment of the present disclosure, in droplet delay time calculation step S406, the second delay time may be calculated by using a plurality of images of the liquid flow obtained by camera device 114. The second laser interrogation point and the droplet separation point are within a pick-up range of camera device 114.

For example, according to an embodiment of the present disclosure, in droplet delay time calculation unit S406, an average value of first measurement times of a plurality of particles may be calculated as the first delay time. For each particle, the first measurement time refers to a difference between the time, determined on the basis of the detection of first detector 106, when the particle passes through the first laser interrogation point and the time, determined on the basis of the detection of second detector 108, when the particle passes through the second laser interrogation point.

For example, according to an embodiment of the present disclosure, in droplet delay time calculation step S406, for each of multiple types of particle sizes, the first delay time for the particle size may be calculated on the basis of first measurement times of a plurality of particles with the particle size, so that the first delay time is calculated to be different for different particle sizes. This operation makes it possible to calculate the first delay time in consideration of particle size, thereby improving the accuracy of the calculated first delay time and then improving the accuracy of the calculated droplet delay time.

For example, according to an embodiment of the present disclosure, method 400 for calculating a droplet delay time may further include a particle size calculation step (not shown in FIG. 4). In the particle size calculation step, for each particle, the size of the particle may be calculated on the basis of a pulse width of a signal obtained by first detector 106 detecting the emission, in response to the first laser beam, of the particle and a spot size of the first laser beam.

For example, according to an embodiment of the present disclosure, in droplet delay time calculation step S406, a lookup table or an expression that characterizes a relationship between particle sizes and first delay times may be further created on the basis of the first delay times of the multiple types of particle sizes.

For example, according to an embodiment of the present disclosure, in laser beam emission step S404, a third laser source may also be used to emit a third laser beam to the liquid flow for fluorescence excitation. In addition, the first laser beam may also be used for fluorescence excitation. In this case, for example, the third laser beam and the first laser beam may be transmitted to the liquid flow along the same path through a light beam adjusting element such as a collimating/focusing element 116 and reflecting mirror 118. That is, the third laser beam and the first laser beam may be combined into one light beam.

For example, according to an embodiment of the present disclosure, the sorting device may be a flow cytometer. For example, the sorting device may be a glass-pool-based flow cytometer. In particular, the nozzle system includes a glass pool and a nozzle. When the sorting device is a glass-pool-based flow cytometer, first laser interrogation point P1 may be located in the glass pool. However, the sorting device is not limited to the flow cytometer, and the sorting device may be any suitable sorting device.

It should be pointed out that although the functional configuration and operation of the droplet delay time calculating system, the sorting device, and the droplet delay time calculating method according to the embodiments of the present disclosure are described above, these are only examples and not limitations, and those skilled in the art can modify the above embodiments according to the principles of the present disclosure. For example, functional modules and operations in each embodiment can be added, deleted, or combined, and such modifications shall all fall within the scope of the present disclosure.

In addition, it should be pointed out that the method embodiment here corresponds to the above system embodiment. Therefore, the content not described in detail in the method embodiment may refer to the description of the corresponding parts in the system embodiment, and the descriptions thereof will be omitted here.

In addition, the present disclosure further provides a storage medium and a program product. It should be understood that machine-executable instructions in the storage medium and the program product according to the embodiments of the present disclosure can also be configured to execute the above-mentioned method for calculating a droplet delay time. Therefore, the content not described in detail here may refer to the descriptions of the previous corresponding parts, and the descriptions thereof will be omitted here.

Correspondingly, a storage medium for carrying the above-mentioned program product including machine-executable instructions is also included in the disclosure of the present disclosure. The storage medium includes, but is not limited to, a floppy disk, an optical disk, a magneto-optical disk, a memory card, a memory stick, and so on.

In addition, it should also be pointed out that the above-mentioned series of processing and devices can also be implemented by software and/or firmware. In the case of implementation by software and/or firmware, programs that constitutes the software are installed from the storage medium or a network to a computer with a dedicated hardware structure, such as a general-purpose personal computer 500 shown in FIG. 5, and the computer can execute various functions during the installation of various programs.

Figure 5:
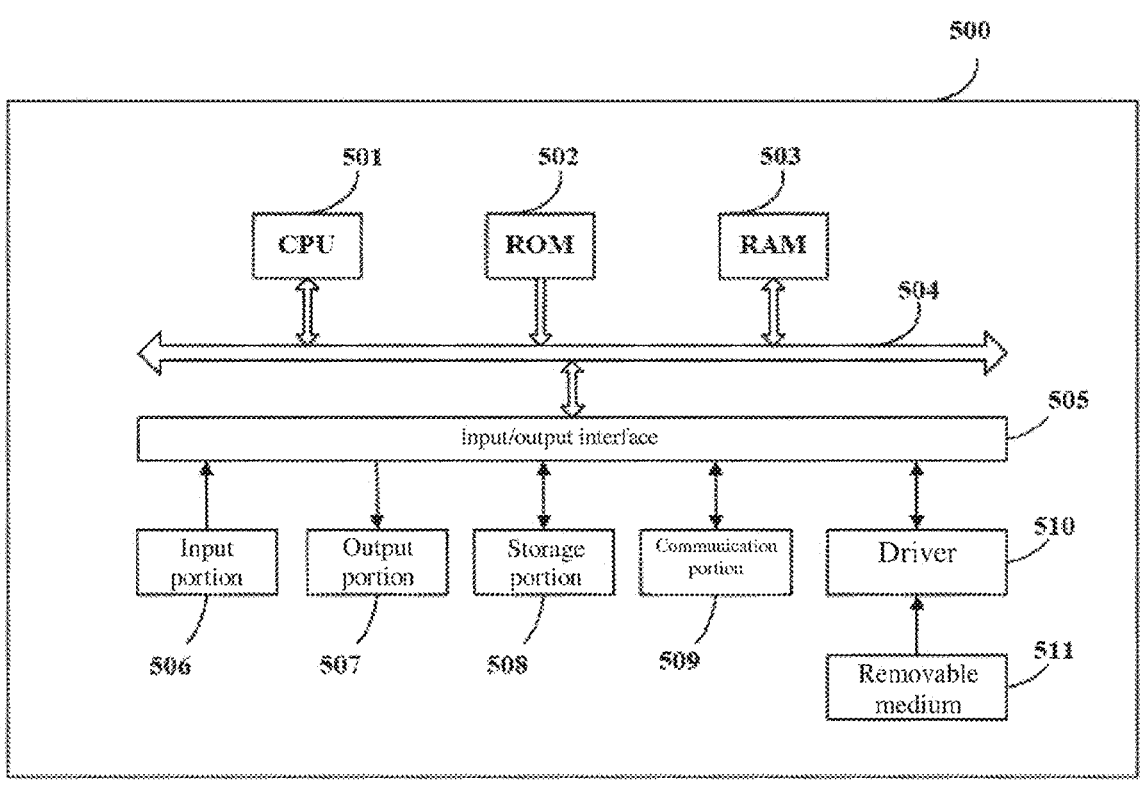
FIG. 5 is a block diagram showing an example structure of a personal computer that can be adopted in an embodiment of the present disclosure.

In FIG. 5, central processing unit (CPU) 501 executes various processing according to a program stored in read-only memory (ROM) 502 or a program loaded from storage portion 508 to random access memory (RAM) 503. Data required when CPU 501 executes various processing and the like is also stored in RAM 503 according to needs.

CPU 501, ROM 502, and RAM 503 are connected to each other via bus 504. Input/output interface 505 is also connected to bus 504.

The following components are connected to input/output interface 505: input part 506 including a keyboard and a mouse; output part 507 including a display such as a cathode ray tube (CRT) and a liquid crystal display (LCD), and a speaker, etc.; storage portion 508 including a hard disk, etc.; and communication portion 509 including a network interface card such as a LAN card and a modems. Communication portion 509 performs communication processing via a network such as the Internet.

Driver 510 is also connected to input/output interface 505 as required. Removable medium 511 such as a magnetic disk, an optical disk, a magneto-optical disk, and a semiconductor memory is mounted on driver 510 as required, so that the computer program read therefrom is installed in storage portion 508 as required.

In the case of implementing the above-mentioned series of processing by software, programs constituting the software are installed from a network such as the Internet or a storage medium such as removable medium 511.

Those skilled in the art should understand that this storage medium is not limited to removable medium 511 shown in FIG. 5, which stores the programs and distributed separately from a device to provide the programs to users. Examples of removable medium 511 include a magnetic disk (including a floppy disk (registered trademark)), an optical disk (including a compact disk read-only memory (CD-ROM) and a digital versatile disk (DVD)), a magneto-optical disk (including a mini disk (MD) (registered trademarks)), and a semiconductor memory. Alternatively, the storage media may be the hard disks included in ROM 502 and storage portion 508, or the like, which store the programs and are distributed to the users together with devices including them.

The preferred embodiments of the present disclosure have been described above with reference to the accompanying drawings, but the present disclosure is of course not limited to the above examples. Those skilled in the art can obtain various changes and modifications within the scope of the appended claims, and it should be understood that these changes and modifications will naturally fall within the technical scope of the present disclosure.

For example, a plurality of functions included in one unit in the above embodiments may be realized by separate devices. Alternatively, multiple functions implemented by multiple units in the above embodiments may be implemented by separate devices, respectively. In addition, one of the above functions can be implemented by multiple units. Needless to say, such a configuration falls within the technical scope of the present disclosure.

In this specification, the steps described in the flow chart include not only the processing performed in time series in the described order, but also processing performed simultaneously or alone rather than necessarily in time series. In addition, even in the steps processed in time series, needless to say, the order can be changed appropriately.

The invention claimed is:

1. A system for calculating a droplet delay time in a liquid flow of a sorting device, comprising:

a first laser source configured to emit a first laser beam to the liquid flow of the sorting device, the first laser beam and the liquid flow intersecting at a first laser interrogation point located in a nozzle system of the sorting device;

a second laser source configured to emit a second laser beam to the liquid flow, the second laser beam and the liquid flow intersecting at a second laser interrogation point located outside the nozzle system, wherein the second laser interrogation point is before a droplet separation point;

a first detector corresponding to the first laser source and configured to detect emission, in response to the first laser beam, of a particle in the liquid flow to determine the time when the particle passes through the first laser interrogation point;

a second detector corresponding to the second laser source and configured to detect emission, in response to the second laser beam, of the particle in the liquid flow to determine the time when the particle passes through the second laser interrogation point;

a processor programmed to calculate, on the basis of the time when the particle in the liquid flow passes through the first laser interrogation point and the time when the particle passes through the second laser interrogation point, a first delay time for the liquid flow flowing from the first laser interrogation point to the second laser interrogation point, and calculate, on the basis of the first delay time, a droplet delay time, wherein the processor is further configured programmed to calculate a second delay time for the liquid flow flowing from the second laser interrogation point to the droplet separation point and calculate the sum of the first delay time and the second delay time as the droplet delay time; and a camera device adapted to obtain an image of the liquid flow, the second laser interrogation point and the droplet separation point being within a pick-up range of the camera device, wherein processor is further programmed to calculate the second delay time by using a plurality of images of the liquid flow obtained by the camera device.

2. The system according to claim 1, wherein the processor is further programmed to calculate an average value of first measurement times of a plurality of particles as the first delay time, wherein for each particle, the first measurement time refers to a difference between the time, determined on the basis of the detection of the first detector, when the particle passes through the first laser interrogation point and the time, determined on the basis of the detection of the second detector, when the particle passes through the second laser interrogation point.

3. The system according to claim 1, wherein the processor is further programmed to: for each of multiple types of particle sizes, calculate a first delay time for the particle size on the basis of first measurement times of a plurality of particles with the particle size, so that the first delay time is calculated to be different for different particle sizes, wherein for each particle, the first measurement time refers to a difference between the time, determined on the basis of the detection of the first detector, when the particle passes through the first laser interrogation point and the time, determined on the basis of the detection of the second detector, when the particle passes through the second laser interrogation point.

4. The system according to claim 3, further comprising a particle size calculation unit configured to, for each particle, calculate the size of the particle on the basis of a pulse width of a signal obtained by the first detector detecting the emission, in response to the first laser beam, of the particle and a spot size of the first laser beam.

5. The system according to claim 3, wherein the processor is further programmed to create, on the basis of first delay times of the multiple types of particle sizes, a lookup table or an expression that characterizes a relationship between particle sizes and first delay times.

6. The system according to claim 1, further comprising a third laser source used for emitting a third laser beam to the liquid flow for fluorescence excitation; and a light beam adjusting element configured to transmit the first laser beam and the third laser beam to the liquid flow along the same path, wherein the first laser beam is also used for fluorescence excitation.

7. The system according to claim 1, wherein the sorting device is a flow cytometer.

8. The system according to claim 7, wherein the flow cytometer is a glass-pool-based flow cytometer;

the nozzle system comprises a glass pool and a nozzle; and the first laser interrogation point is located in the glass pool.

9. A sorting device, comprising the system according to claim 1.

10. A method for calculating a droplet delay time in a liquid flow of a sorting device, comprising:

respectively using a first laser source and a second laser source of the sorting device to emit a first laser beam and a second laser beam to a liquid flow of the sorting device;

calculating, on the basis of the time, determined on the basis of detection of a first detector of the sorting device, when a particle in the liquid flow passes through a first laser interrogation point located in a nozzle system of the sorting device and the time, determined on the basis of detection of a second detector of the sorting device, when the particle passes through a second laser interrogation point outside the nozzle system, a first delay time for the liquid flow flowing from the first laser interrogation point to the second laser interrogation point;

calculating a droplet delay time on the basis of the first delay time, wherein the first laser beam and the liquid flow intersect at the first laser interrogation point;

wherein the second laser beam and the liquid flow intersect at the second laser interrogation point;

wherein the second laser interrogation point is before a droplet separation point;

wherein the first detector is configured to detect emission, in response to the first laser beam, of the particle in the liquid flow to determine the time when the particle pass through the first laser interrogation point; and wherein the second detector is configured to detect emission, in response to the second laser beam, of the particle in the liquid flow to determine the time when the particle pass through the second laser interrogation point; and calculating a second delay time for the liquid flow flowing from the second laser interrogation point to the droplet separation point, wherein the operation of calculating the droplet delay time comprises:

calculating the sum of the first delay time and the second delay time as the droplet delay time; and calculating the second delay time by using a plurality of images of the liquid flow obtained by a camera device, wherein the second laser interrogation point and the droplet separation point are within a pick-up range of the camera device.

11. The method according to claim 10, wherein the operation of calculating the first delay time comprises: calculating an average value of first measurement times of a plurality of particles as the first delay time, wherein for each particle, the first measurement time refers to a difference between the time, determined on the basis of the detection of the first detector, when the particle passes through the first laser interrogation point and the time, determined on the basis of the detection of the second detector, when the particle passes through the second laser interrogation point.

12. The method according to claim 10, wherein the operation of calculating the first delay time comprises: for each of multiple types of particle sizes, calculating a first delay time for the particle size on the basis of first measurement times of a plurality of particles with the particle size, so that the first delay time is calculated to be different for different particle sizes, wherein for each particle, the first measurement time refers to a difference between the time, determined on the basis of the detection of the first detector, when the particle passes through the first laser interrogation point and the time, determined on the basis of the detection of the second detector, when the particle passes through the second laser interrogation point.

13. The method according to claim 12, further comprising: for each particle, calculating the size of the particle on the basis of a pulse width of a signal obtained by the first detector detecting the emission, in response to the first laser beam, of the particle and a spot size of the first laser beam.

14. The method according to claim 12, wherein the operation of calculating the first delay time further comprises: creating, on the basis of first delay times of the multiple types of particle sizes, a lookup table or an expression that characterizes a relationship between particle sizes and first delay times.

15. The method according to claim 10, further comprising: using a third laser source of the sorting device to emit a third laser beam to the liquid flow for fluorescence excitation, wherein the first laser beam is also used for fluorescence excitation, and wherein the first laser beam and the third laser beam are transmitted to the liquid flow along the same path by a light beam adjusting element of the sorting device.

16. The method according to claim 10, wherein the sorting device is a flow cytometer.

17. The method according to claim 16, wherein the flow cytometer is a glass-pool-based flow cytometer, the nozzle system comprises a glass pool and a nozzle; and the first laser interrogation point is located in the glass pool.

* * * * *